US006858317B2

(12) United States Patent
Aamodt et al.

(10) Patent No.: US 6,858,317 B2
(45) Date of Patent: Feb. 22, 2005

(54) METHOD FOR PROTECTING WOOD AND WOOD PRODUCTS FROM MOLD AND SAPSTAINING FUNGI

(75) Inventors: James A. Aamodt, The Dalles, OR (US); John W. Colvin, Canby, OR (US)

(73) Assignee: Cathm, LLC, Canby, OR (US)

( * ) Notice: Subject to any disclaimer, the term of this patent is extended or adjusted under 35 U.S.C. 154(b) by 0 days.

(21) Appl. No.: 10/459,047

(22) Filed: Jun. 10, 2003

(65) Prior Publication Data

US 2004/0253470 A1 Dec. 16, 2004

(51) Int. Cl.[7] .................................... B32B 21/06

(52) U.S. Cl. .................... 428/535; 428/536; 428/537.1; 514/552; 514/558

(58) Field of Search ................................ 428/535, 536, 428/537.1; 514/552, 558

(56) References Cited

U.S. PATENT DOCUMENTS

| | | | | | |
|---|---|---|---|---|---|
| 4,337,117 | A | * | 6/1982 | Bodendorf et al. | 162/161 |
| 4,847,067 | A | * | 7/1989 | Thomas | 424/639 |
| 5,208,257 | A | * | 5/1993 | Kabara | 514/552 |
| 6,014,819 | A | * | 1/2000 | Elder | 34/396 |
| 6,083,537 | A | * | 7/2000 | Yang | 424/715 |
| 6,132,786 | A | * | 10/2000 | Poulos et al. | 426/326 |
| 6,416,789 | B1 | * | 7/2002 | Marks et al. | 424/641 |

* cited by examiner

*Primary Examiner*—Ieszek B Kiliman
(74) *Attorney, Agent, or Firm*—Holland & Bonzagni, P.C.; Mary R. Bonzagni

(57) ABSTRACT

A method for protecting wood and wood products from mold and sapstaining fungi for periods of at least about seven months is provided. The method employs a non-toxic mold inhibitor, which has been found to be unusually effective in providing resistance to mold and sapstaining fungi. Mold and fungi resistant wood and wood products are also provided.

20 Claims, No Drawings

METHOD FOR PROTECTING WOOD AND WOOD PRODUCTS FROM MOLD AND SAPSTAINING FUNGI

TECHNICAL FIELD

The present invention generally relates to a method for protecting wood and wood products from mold and sapstaining fungi, and more particularly relates to a method for protecting wood and wood products to minimize or eliminate staining of the wood due to mold growth and sapstaining fungi prior to seasoning (e.g., treating or drying) and storage. The present invention further relates to mold and fungi to resistant wood and wood products protected in accordance with this method.

BACKGROUND ART

When a hardwood tree (e.g., red or white oak, ash, maple, poplar) is initially cut down, it has a moisture content ranging from about 60 to about 100%, while a softwood tree (e.g., yellow pine) can have a moisture content as high as 150%. The lumber industry requires that the moisture content of such "green" lumber be reduced to levels of from about 6 to about 8% (via air drying and/or kiln drying) prior to the wood being fabricated into various wood products.

The moisture content of wood, which is usually expressed as a percentage, is the ratio of the amount of water in a piece of wood compared to the weight of that same piece of wood when all of the moisture has been removed. One method for determining the moisture content of wood involves weighing a given sample of wood and recording the weight (the "wet weight"), placing the wood sample in an oven, heating the sample to a temperature of greater than or equal to 108° C. until all of the moisture has been removed, and recording the weight of the dried wood sample (the "oven dry weight"). The moisture content of the wood sample is then determined using the following formula:

$$\%\text{ moisture content (MC)} = \frac{(\text{wet weight} - \text{oven dry weight})}{(\text{oven dry weight})} \times 100$$

Prior to air and/or kiln drying, green lumber is susceptible to degradation from molds and sapstaining fungi. Molds grow on the surface of wood and cause discoloration through the mass production of spores. Sapstaining fungi penetrate deeply into sapwood (i.e., the central portion or heartwood of the tree) through their dark pigmented thread-like filaments or hyphae and stain wood to a black, blueish or grey appearance. Where lumber customers place a high value on the appearance and quality of the product they receive, wood stain can significantly reduce the value of the lumber by lowering its grade, rendering it less desirable for use in certain applications.

Superficial treatment of freshly cut green lumber is carried out at some mills within twenty-four hours to control staining. Treatments typically take the form of a chemical dip or spray, with known chemical treatments including detergent/bleach/water mixtures, copper-8-quinolinolate, other chemical treatments with a borate base, chlorothalonil (CTL) (tetrachloroisophthalonitrile) organic biocide, organic triazole biocides, ammoniacal solutions, zinc oxide and alkaline salts.

Unfortunately, these chemical treatments have been found to be expensive and/or harmful to the environment. In addition, these treatments are limited in terms of the amount of time the green lumber is protected from mold and sapstaining fungi.

It is therefore an object of the present invention to overcome the drawbacks inherent in known green wood chemical treatments.

It is a more particular object to provide a method for protecting wood and wood products from mold and sapstaining fungi, which employs nontoxic mold inhibitors.

It is another object to provide mold and fungi resistant wood and wood products that may be stored unprotected in the outdoors for longer periods of time without surface or sapwood discoloration.

It is a further object to provide mold and fungi resistant wood and wood products that are protected by a method that employs nontoxic mold inhibitors.

SUMMARY OF THE INVENTION

The present invention therefore provides mold and fungi resistant wood and wood products, wherein the wood and wood products display no visible surface or sapwood discoloration when exposed to normal weather conditions for periods of at least about seven months.

The present invention also provides a method for protecting wood and wood products, wherein the method comprises treating the wood and/or wood product with a non-toxic mold inhibitor selected from the group of organic acids, salts of organic acids, metals, plant extracts, and mixtures thereof.

The present invention further provides mold and fungi resistant wood and wood products that are protected in accordance with the method described above.

Other features and advantages of the invention will be apparent to one of ordinary skill from the following detailed description and accompanying drawings.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BEST MODE FOR CARRYING OUT THE INVENTION

The mold inhibitor of the present invention has been found to be unusually effective in providing resistance to mold and sapstaining fungi. In fact, green wood treated with the inventive mold inhibitor showed no surface or sapwood discoloration when continuously exposed to normal weather conditions for periods of at least about seven months, while green wood treated with conventional sapstain control products (e.g., borate based mixtures of NP-1, BRITEWOOD XL and MYCOSTAT P fungicides) displayed significant (if not total or nearly total) surface darkening due to mold growth. In addition, the mold inhibitor of the present invention has been determined by the Environmental Protection Agency (EPA) to be of minimum risk and therefore has been exempted from the requirements of the Federal Insecticide, Fungicide and Rodenticide Act (FIFRA) by regulation. As is well known to those skilled in the art, the chemical industry, and in particular the use of "pesticides", is regulated in the United States by the EPA under authority of the FIFRA.

Although the present invention is particularly suited for protecting green wood and green wood products, which have a moisture content or MC ranging from about 60 to about 150% by weight, the invention is not so limited. In fact, a variety of wood, wood composites and engineered wood products including, but not limited to, Douglas fir, hemlock, pine, plywood and laminated boards, are contemplated for use in this invention.

As noted above, the mold inhibitor of the present invention is selected from the group of organic acids, salts of organic acids, metals, plant extracts, and mixtures thereof.

Suitable organic acids include citric acid, acetic acid, ascorbic acid, maleic acid, and mixtures thereof. In a preferred embodiment, the organic acid is citric acid.

Salts of organic acids contemplated for use in the present invention include potassium sorbate, sodium lauryl sulfate, and mixtures thereof. In a preferred embodiment, the organic acid salt is potassium sorbate.

A suitable metal is zinc dust.

Plant extracts contemplated for use in the present invention include castor oil, cedar oil, cinnamon oil, cinnamon leaf oil, citronella oil, clove oil, corn oil, cottonseed oil, garlic oil, geranium oil, lemongrass oil, linseed oil, mint oil, peppermint oil, rosemary oil, and mixtures thereof. In a preferred embodiment, the plant extract is either lemongrass oil or cinnamon leaf oil.

More preferred mold inhibitors are selected from the group of citric acid, potassium sorbate, zinc dust, lemongrass oil, cinnamon leaf oil, mixtures of citric acid and either lemongrass oil, cinnamon leaf oil, or potassium sorbate, and mixtures of cinnamon leaf oil and zinc dust.

For mixtures of citric acid and either lemongrass oil, cinnamon leaf oil, or potassium sorbate, it is preferred that the mixtures comprise from about 50 to about 95% by wt. (more preferably from about 65 to about 80% by wt.) of citric acid, and from about 50 to about 5% by wt. (more preferably from about 35 to about 20% by wt.) of the second component, while for mixtures of cinnamon leaf oil and zinc dust, it is preferred that the mixtures comprise from about 50 to about 95% by wt. (more preferably from about 65 to about 80% by wt.) of cinnamon leaf oil, and from about 50 to about 5% by wt. (more preferably from about 35 to about 20% by wt.) of zinc dust.

In the method for protecting wood and wood products of the present invention, the mold inhibitor can be applied to the surface of the wood or wood product by any suitable method or technique. For example, the mold inhibitor may be applied by spraying or dipping the wood in a solution or suspension containing the mold inhibitor and one or more solvents.

The solvent is preferably an organic solvent, and more preferably a polar organic solvent such as alcohol for better solubilizing the mold inhibitor.

The organic solvent may be used alone or in combination with one or more additional solvents, such as water.

The solution or suspension containing the mold inhibitor and one or more solvents may contain additional components such as adhesives or binders, wetting agents, and waxes.

In a preferred embodiment, the mold inhibitor is applied as a solution or suspension comprising from about 0.10 to about 20% by wt. (preferably from about 0.25 to about 2% by wt.) of the mold inhibitor, from about 75 to about 95% by wt. (preferably from about 80 to about 90% by wt.) of alcohol, and from about 20 to is about 50% by wt. (preferably from about 25 to about 35% by wt.) of water.

In more preferred embodiments, if the mold inhibitor is a plant extract, it is present in the solution or suspension in an amount ranging from about 0.10 to about 5% by wt., preferably from about 0.25 to about 1% by wt. If the mold inhibitor is an organic acid or salt of an organic acid, it is present in the solution or suspension in an amount ranging from about 1.5 to about 20% by wt., preferably from about 0.50 to about 2% by wt., while metal mold inhibitors are present in amounts ranging from about 0.50 to about 5% by wt., preferably from about 0.50 to about 1.5% by wt.

The modes of application may include low or high pressure spraying, brushing, misting, fogging, immersion, injection, spreading, insertion, and pressure treatment.

A quantity ranging from about 3 to about 15 gallons of the mold inhibitor solution or suspension is absorbed by 1000 board feet of wood or lumber. The term "board foot" is a unit of timber measure equal to a piece of board 1 foot square and 1 inch thick. The treated wood or wood product, as noted above, shows no surface or sapwood discoloration for at least about seven months, preferably for at least about eight months, when continuously exposed to normal weather conditions, such as temperature, humidity, wind and rain.

The subject invention will now be described by reference to the following illustrative examples. The examples are not, however, intended to limit the generally broad scope of the present invention.

WORKING EXAMPLES

The following examples comprise actual tests that were run on various green woods under the present inventive method for successfully preventing stains from occurring on wood. The tests involved defect-free green logs of western hemlock fir, which were cut into lumber measuring 2 inches×4 inches×96 inches.

For the first test, green logs from three different lumber mills were evaluated. One half of each piece of cut lumber was sprayed with a quantity of the mold inhibitor suspension/solution (as identified in Table 1) that was equal to 15 gallons of the suspension/solution per 1000 board feet of test lumber, leaving the other half untreated. The sprayed pieces of test lumber were dried, stacked in groups of ten, bundled, wrapped in plastic and left outdoors at each lumber mill from Jul. 24, 2002 until Feb. 15, 2003. The test lumber was visually inspected at six weeks, two months, three months and six months, with no mold growth observed on the test lumber portions treated by way of the inventive method. At the end of this test period, the lumber was unstacked and the percentage of surface sapwood discolored was evaluated on a visual basis. In particular, an evaluator examined the treated surface of each sample and estimated the percentage of discoloration on the sapwood surface. The results were recorded and are set forth in Table 1 below.

For the second test, green logs from a single lumber mill were evaluated, with one half of each piece of cut lumber being dipped with the mold inhibitor suspension or solution identified below in Table 1, leaving the other half untreated. The dipped pieces of test lumber were dried, stacked in groups of ten, bundled, wrapped in plastic and left outdoors at the lumber mill from Mar. 13, 2003 until May 2, 2003. At the end of the test period, the lumber was unstacked and visually evaluated as described above. The results were recorded and are set forth in Table 1 below.

TABLE 1

Summary of Examples 1 to 11 and Comparative Examples C-1 to C-8

| Example | Test Location[2] | Mold Inhibitor[1] (% by wt.) Citric Acid | Lemongrass Oil | Cinnamon Leaf Oil | Prior Art Sapstain Control Product Treatment[3] | Degree of Discoloration (%) |
|---|---|---|---|---|---|---|
| Test 1 | | | | | | |
| 1 | A | 1.0 | — | 0.5 | — | <5 |
| 2 | A | — | 1.0 | — | — | 10 |
| 3 | A | 1.0 | 0.5 | — | — | 10 |
| C-1 | A | — | — | — | ✓ | 65 |
| C-2 | A | — | — | — | — | 100 |
| 4 | B | 1.0 | — | 0.5 | — | 7 |
| 5 | B | — | — | 1.0 | — | 12 |
| 6 | B | 1.0 | 0.5 | — | — | 20 |
| C-3 | B | — | — | — | ✓ | 45 |
| C-4 | B | — | — | — | — | 90 |
| 7 | C | 1.0 | — | 0.5 | — | 5 |
| 8 | C | — | — | 1.0 | — | 15 |
| 9 | C | 1.0 | 0.5 | — | — | 20 |
| C-5 | C | — | — | — | ✓ | 35 |
| C-6 | C | — | — | — | — | 70 |
| Test 2 | | | | | | |
| 10 | B | 1.0 | — | 0.5 | — | 0 |
| 11 | B | 1.0 | — | 0.5 | — | 0 |
| C-7 | B | — | — | — | ✓ | 15 |
| C-8 | B | — | — | — | — | 76 |

[1]Test 1 Solvent(s) = 100% water
Test 2 Solvent(s) = (50% water/50% alcohol)
[2]Test Location A = Trask River, OR
Test Location B = Tumwater, WA
Test Location C = Glide, OR
[3]1 part borate based BRITEWOOD XL fungicide/35 parts water The results shown in Table 1 indicate that the mold and fungi resistant wood and wood products of the present invention (i.e., Examples 1 to 11) demonstrate significantly improved resistance to mold and sapstaining fungi. More specifically, Examples 1 to 9 and 10 to 11 showed no significant surface or sapwood discoloration when exposed to normal weather conditions for a seven month period and for a two month period, respectively, while untreated wood (Comparative Examples C-2, C4, C-6 and C-8) and wood treated with a conventional sapstain control product (Comparative Examples C-1, C-3, C5 and C-7) showed significant darkening (and in some cases total or nearly total darkening) of the wood surface when exposed to the same conditions over the same time periods.

While various embodiments of the present invention have been described above, it should be understood that they have been presented by way of example only, and not limitation. Thus, the breadth and scope of the present invention should not be limited by any of the exemplary embodiments.

We claim:

1. A wood or wood product resistant to growth of mold and sapstaining fungi, said wood or wood product comprising:

unseasoned, cut wood having on a surface thereof a non-toxic mold inhibitor selected from the group consisting of organic acids, salts of organic acids, metals, plant extracts, and mixtures thereof.

2. The wood or wood product of claim 1, wherein said wood or wood product displays no visible surface or sapwood discoloration when continuously exposed to normal weather conditions for periods of at least about seven months.

3. The wood or wood product of claim 1, wherein said non-toxic mold inhibitor is an organic acid which is selected from the group of citric acid, acetic acid, ascorbic acid, maleic acid, and mixtures thereof.

4. The wood or wood product of claim 3, wherein said non-toxic mold inhibitor is citric acid.

5. The wood or wood product of claim 1, wherein said non-toxic mold inhibitor is a salt of an organic acid which is selected from the group of potassium sorbate, sodium lauryl sulfate, and mixtures thereof.

6. The wood or wood product of claim 5, wherein said non-toxic mold inhibitor is potassium sorbate.

7. The wood or wood product of claim 1, wherein said non-toxic mold inhibitor is a metal.

8. The wood or wood product of claim 7, wherein said non-toxic mold inhibitor is zinc dust.

9. The wood or wood product of claim 1, wherein said non-toxic mold inhibitor is a plant extract selected from the group of castor oil, cedar oil, cinnamon oil, cinnamon leaf oil, citronella oil, clove oil, corn oil, cottonseed oil, garlic oil, geranium oil, lemongrass oil, linseed oil, mint oil, peppermint oil, rosemary oil, and mixtures thereof.

10. The wood or wood product of claim 9, wherein said non-toxic mold inhibitor is lemongrass oil.

11. The wood or wood product of claim 9, wherein said non-toxic mold inhibitor is cinnamon leaf oil.

12. The wood or wood product of claim 1, wherein said non-toxic mold inhibitor is a mixture of an organic acid and a plant extract.

13. The wood or wood product of claim 12, wherein said organic acid is citric acid and wherein said plant extract is cinnamon leaf oil.

14. The wood or wood product of claim 12, wherein said organic acid is citric acid and wherein said plant extract is lemongrass oil.

15. A method for protecting wood and wood products from mold and sapstaining fungi, wherein said method comprises applying to a surface of an unseasoned, cut wood or wood product a non-toxic mold inhibitor selected from the group consisting of organic acids, salts of organic acids, metals, plant extracts, and mixtures thereof.

16. The method of claim 15, wherein said non-toxic mold inhibitor is applied as a solution or suspension comprising from about 0.10 to about 20% by wt., based on the total weight of said solution or suspension, of said mold inhibitor.

17. The method of claim 16, wherein said non-toxic mold inhibitor is applied as a solution or suspension comprising from about 0.25 to about 2% by wt., based on the total weight of said solution or suspension, of said mold inhibitor.

18. An unseasoned, cut wood or wood product protected by a method which comprises applying to a surface of said wood or wood product a non-toxic mold inhibitor selected from the group consisting of organic acids, salts of organic acids, metals, plant extracts, and mixtures thereof.

19. The wood or wood product of claim 18, which has absorbed a quantity of said mold inhibitor solution or suspension ranging from about 3 to about 15 gallons per 1000 board feet of said wood or wood product.

20. The wood or wood product of claim 18, wherein said non-toxic mold inhibitor is a mixture of an organic acid and a plant extract, wherein said organic acid is citric acid and wherein said plant extract is selected from the group of cinnamon leaf oil and lemongrass oil.

* * * * *